United States Patent [19]

Knizia

[11] Patent Number: 4,896,498
[45] Date of Patent: Jan. 30, 1990

[54] PROCESS FOR CONTROLLING THE POWER OUTPUT OF A COMBINATION COAL-FIRED UNIT WITH INTEGRATED COAL GASIFICATION AND A COAL POWER STATION OPERATING ACCORDING TO THE PROCESS

[76] Inventor: Klaus Knizia, Blumenweg 17, 5804 Herdecke, Fed. Rep. of Germany

[21] Appl. No.: 235,036

[22] Filed: Aug. 22, 1988

[30] Foreign Application Priority Data

Sep. 19, 1987 [DE] Fed. Rep. of Germany ..... 37316273

[51] Int. Cl.[4] ............................................... F02C 3/28
[52] U.S. Cl. .................... 60/39.03; 60/39.12; 60/39.182
[58] Field of Search ............... 60/39.02, 39.03, 39.12, 60/39.182, 39.2

[56] References Cited

U.S. PATENT DOCUMENTS

| | | | |
|---|---|---|---|
| 3,086,362 | 4/1963 | Foster-Pegg | 60/39.12 |
| 3,446,014 | 5/1969 | Foster-Pegg | 60/39.182 |
| 3,505,811 | 4/1970 | Underwood | 60/39.03 |
| 3,991,557 | 11/1976 | Donath | 60/39.12 |
| 4,081,956 | 4/1978 | Baker et al. | 60/39.182 |
| 4,368,103 | 1/1983 | Weinzierl et al. | 60/39.12 |
| 4,387,560 | 6/1983 | Hamilton et al. | 60/39.12 |
| 4,470,255 | 9/1984 | Rowlands et al. | 60/39.12 |

Primary Examiner—Louis J. Casaregola
Attorney, Agent, or Firm—Toren, McGeady & Associates

[57] ABSTRACT

A coal power station operated using the combined gas turbine-steam turbine process, comprising a gas turbine plant and a steam turbine plant with a steam generator, a furnace and a steam turbine and for which coal is partly gasified in a coal gasification installation, the fuel gas produced is supplied to the gas turbine and the residual coke to the furnace of the steam generator, wherein the control of power output between full load and part load is performed by increasing the proportion of the total power output of the power station provided by the gas turbine plant and the degree of gasification in the coal gasification installation from full load to part load, the amount of fuel gas produced being adjusted according to the power requirement of the gas turbine plant and the proportion of residual coke being reduced according to the power requirement of the steam turbine, while decreasing the amount of coal supplied overall. In this manner a decrease in efficiency at part load can be reduced.

11 Claims, 1 Drawing Sheet

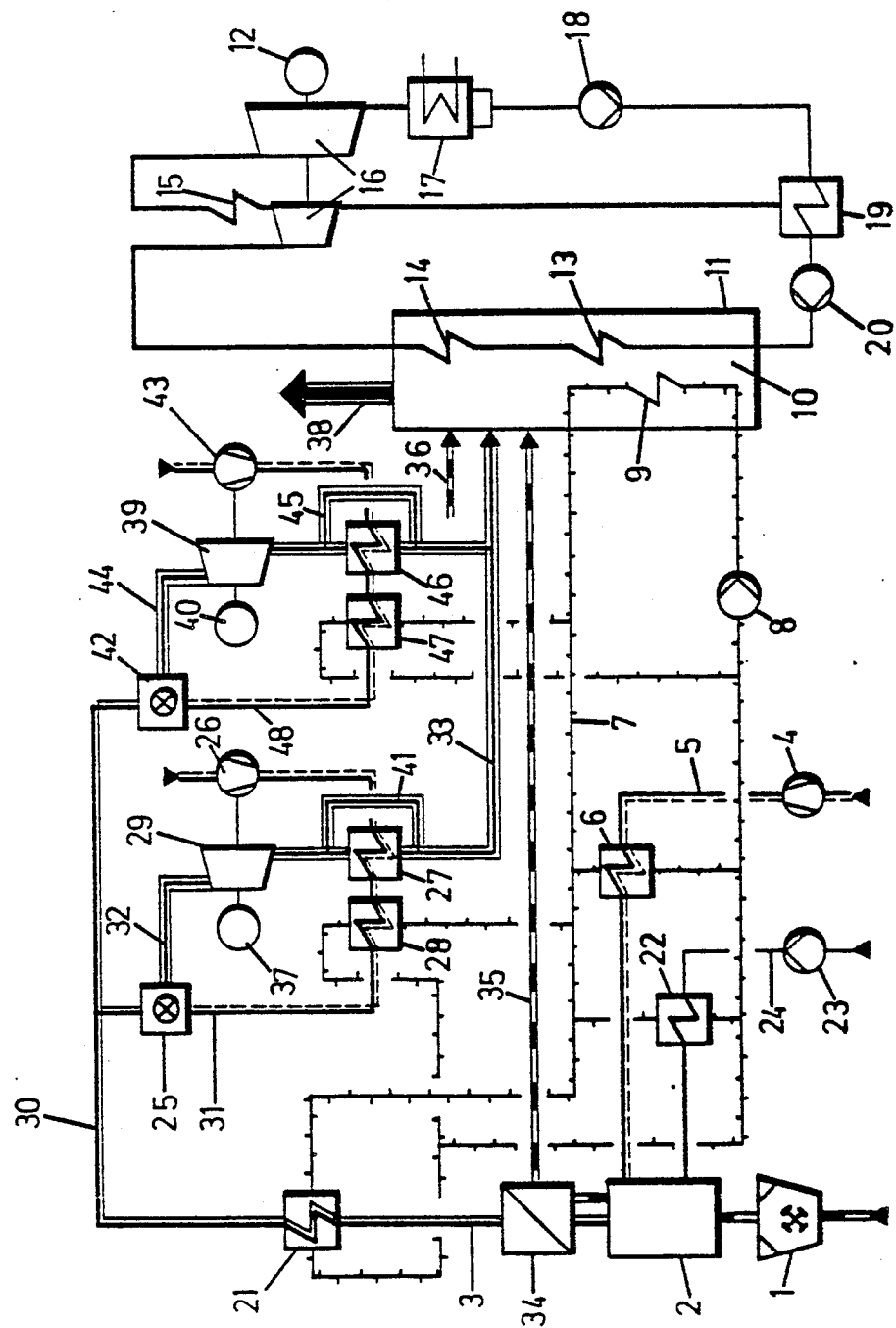

4,896,498

PROCESS FOR CONTROLLING THE POWER OUTPUT OF A COMBINATION COAL-FIRED UNIT WITH INTEGRATED COAL GASIFICATION AND A COAL POWER STATION OPERATING ACCORDING TO THE PROCESS

TITLE OF THE INVENTION

A process for controlling the power output of a combination coal-fired unit with integrated coal gasification and a coal power station operating according to the process.

TECHNICAL FIELD OF THE INVENTION AND PRIOR ART

The invention relates to a process for the control of the power output of a coal power station, operated using the combined gas turbine-steam turbine process by means of a gas turbine plant and a steam power plant comprising a steam generator, a furnace and a steam turbine, in which the coal is partly gasified in a coal gasification installation, the fuel gas produced is supplied to the gas turbine and the residual coke to the furnace of the steam generator, and to a coal power plant that is operated in particular according to the process.

In DE-OS 28 53 645 a process and a coal power plant of this kind are described. However there are no details about the control between full load and part load.

A similar process is also described in DE-OS 36 03 095 and is characterised in particular by a heat transfer system, using liquid sodium as heat transfer medium, arranged between the gas turbine plant and the furnace of the steam generator. Here too nothing is said about the control between full load and part load.

OBJECT OF THE INVENTION

It is therefore the object of the invention to provide a process for controlling the power output of a coal power plant by which it is possible to obtain a wide range of control between full load and part load while maintaining overall efficiency as high as possible.

BRIEF DESCRIPTION OF THE INVENTION

The object is achieved according to the invention in that with a power station of the kind mentioned in the introduction the proportion of the total power output of the power station provided by the gas turbine plant and the degree of gasification in the coal gasification installation are controlled so as to increase from full load to part load, the amount of fuel gas produced being adjusted according to the power requirement of the gas turbine and the proportion of residual coke being reduced according to the power requirements of the steam turbine, while decreasing the amount of coal supplied overall.

The invention is based on the discovery that the efficiency of a gas turbine plant falls more quickly in part load operation than that of a steam power plant, so that with the control according to the invention the power available from the gas turbine plant can be held in the range of its optimal efficiency, while in contrast the power available from the steam power plant can be reduced more than proportionally without the overall efficiency in the part load region falling substantially.

In order to adapt the heat supply in the coal gasification installation, in the gas turbine plant and in the furnace of the steam generator to the requirements at full load or part load a heat transfer system is provided between the gas turbine plant, the furnace of the steam generator and the coal gasification installation, the temperatures of which can be controlled to increase from full load to part load. This is done in particular in the gas turbine plant by increasing the temperature of the fuel gas and/or the compressed air supplied and in the coal gasification installation by increasing the temperature of the process air and if necessary by altering the amount of process air supplied to the coal gasification installation.

The maximum temperature possible in the heat transfer system is therefore reached not at the design point, i.e. when the coal power plant is at full load, but first in the part load region. This means that even when the gas production of the coal gasification installation is decreasing, which occurs from a specific load point irrespective of the increase in the degree of gasification, it is possible to obtain a balance in the supply of energy for the gas turbine by increasing the temperatures of the fuel gases and the compressed air supplied.

In addition, despite the fluctuating degree of gasification in the coal gasification installation, an almost unchanged quality of gas is ensured. A higher degree of gasification requires correspondingly higher working temperatures of the coal gasification installation, which are normally achieved by a more complete partial combustion in the autothermic process, i.e. by an increase in the supply of oxidant, for example the air. This, however, results in the fuel gas produced being more highly loaded with nitrogen, whereby the quality of the gas falls. This disadvantage can be counteracted by preheating the process air supplied to a higher temperature.

Since the degree of gasification at the design point of the power station is deliberately low, so as to make possible a corresponding increase in part load operation, the furnace of the steam generator in the upper load region is supplied, apart from the residual coke from the coal gasification installation, with additional fuel, for example coal.

The compressed air for the gas turbine plant is preferably preheated in two stages, heat being supplied from the gas turbine exhaust gases in the first stage and heat being supplied from the furnace of the steam generator in the second stage. The control of the temperature of the compressed air before it enters the combustion chamber of the gas turbine is then very simple, in that a recuperator arranged in the gas turbine exhaust line is not fully loaded when at full load because part of the gas turbine exhaust gases is diverted past the recuperator through an adjustable by-pass. As a result the gas turbine inlet temperature and thus the gas turbine power output can be maintained even when there is a smaller amount of gaseous fuel available in the part load range of the unit.

It is particularly advantageous to use in the heat transfer system between the steam generator and the gas turbine a heat transfer medium that is liquid at a slight overpressure and high temperatures, for example sodium, to heat the compressed air. The advantages associated with this are described in detail in DE-0S 36 03 095.

Since, as already explained, the efficiency of a gas turbine operating at part load falls relatively sharply, between full load and part load of the power station the gas turbine plant should be controlled to operate with substantially constant power output and the steam power plant to operate with decreasing power output. For a wide control range between full load and part load it can therefore be advantageous to divide the gas turbine power into several units which can be driven with substantially constant power. The gas turbine power output can thus be controlled by switching off one or more units and the steam turbine power output can be controlled so as to decrease between full load and part load of the power station. Thermodynamically this has two effects on the overall process. Firstly the proportion of the gas turbine power remaining in the process is operated at constant high efficiency (design point) and secondly the exhaust gas available from the gas turbine, which has to be accepted by the steam generator, is reduced. Receiving the gas turbine exhaust gases in the steam generator means not only that a certain excess of air must necessarily be moved in the furnace, but also that due to the higher excess of air compared with a near stoichiometric combustion a larger amount of flue gas must be cooled in the following heating surfaces. If the amount of flue gas, which is substantially determined by the amount of exhaust gases from the gas turbine, cannot be reduced at part load, which is the case with a gas turbine in the part load region, a disproportion arises in the overall process between the heat sources and the available heat sinks. Since the amounts of condensation and feed water of the steam power plant are reduced sharply with decreasing load, cooling the flue gases of the steam generator to the desired lower stack inlet temperature would no longer be possible and a deterioration in efficiency would result. This is avoided by the division into several gas turbine units.

The basic object of the invention is also achieved, according to the invention, with a coal power plant of the kind mentioned in the introduction by a heat transfer system, arranged between the gas turbine plant, the furnace of the steam generator and the coal gasification installation, having a heat transfer medium that is liquid at a slight overpressure and high temperatures and a heat exchanger in the exhaust stream of the gas turbine plant to preheat the compressed air of the gas turbine plant and having an adjustable bypass arranged parallel to it. With this heat transfer system heat can be uncoupled, as required, from the steam power plant and transferred to the gas turbine plant and the coal gasification installation. The use of a heat medium that is liquid at a slight overpressure and high temperatures ensures a high temperature level in the heat transfer system.

For this purpose the heat transfer system comprises a heat transfer medium heater arranged in the furnace of the steam generator, a process air preheater, a process steam generator, a fuel gas preheater and a preheater for the compressed air of the gas turbine plant. The heat exchanger arranged in the exhaust gas stream of the gas turbine plant forms the first stage and the preheater exposed to the heat transfer medium forms the second stage of a two-stage preheating system for the compressed air. With this arrangement the temperature of the compressed air of the gas turbine plant can be controlled in a simple manner by a by-pass arranged parallel to the exhaust gas heat exchanger by means of which, at full load, part of the exhaust gas is diverted past the exhaust gas heat exchanger.

In order to be able to maintain high efficiency of the overall plant over a wide load range the gas turbine plant can comprise at least two gas turbines arranged in parallel which can be switched on and off as required.

The process according to the invention and the coal power plant operated according to the process are thus characterised in that the temperature of the heat transfer system is increased when the load of the combined unit falls so as to increase the amount of heat available for the gas turbine plant, and in that the individual gas turbines can be held at full power even at part load. In addition, the process air temperature is also increased as the load of the unit falls in order to be able to increase the degree of gasification in the coal gasification installation largely without decreasing the quality of the gas.

BRIEF DESCRIPTION OF THE DRAWING

The invention will now be described in more detail with reference to an exemplary embodiment shown in the drawing.

DETAILED DESCRIPTION OF A PREFERRED EMBODIMENT OF THE INVENTION

Coal dust from a milling plant 1 arrives at a gasification reactor 2. Its product gas and the residual coke are separated in a separating device 34. The product gas is conveyed from the separating device 34 by a product gas line 3 and the residual coke by way of a coke transporting line 35. The air necessary for the gasification is compressed into a process air line 5 by means of a compressor 4 and flows into the gasification reactor 2. In the process air line 5 there is a process air preheater 6 which is exposed to heat from a sodium circuit 7 provided with a circulating pump 8.

The steam necessary for the gasification is produced in a process steam generator 22 in which feed water arrives by way of a pump 23 and a line 24. When the process steam generator 22 is fed with steam it acts as a process steam superheater. The sodium absorbs the heat in a sodium heater 9 from the flue gas of the furnace 10 of a steam generator 11.

The steam produced in a vaporizer 13 of the steam generator 11 is first led through a superheater 14 and then arrives in a steam turbine 16 having a high pressure stage and a low pressure stage. The steam turbine 16 drives a generator 12. Arranged between the high pressure stage and the low pressure stage of the steam turbine 13 is an intermediate superheater 15. Tappings are located on the steam turbine 16 which serve to preheat the feed water in a feed water preheater 19. The steam leaving the steam turbine 13 is condensed in a condenser 17, forced by means of a condenser pump 18 into the feed water preheater 19 and conveyed by means of a feed water pump 20 into the steam generator 11.

The fuel gas arrives by way of the line 3 in a fuel gas preheater 21 which is also arranged in the sodium circuit 7 and is therefore acted on by heat uncoupled from the furnace 10. By way of a fuel gas line 30 the heated fuel gas arrives in combustion chambers 25, 42 to which compressed and preheated air is supplied by way of lines 31, 48. The air is compressed in compressors 26, 43, arrives in heat exchangers 27, 46 formed as recuperators and from there into further air heaters 28, 47 which are acted on by heated sodium from the sodium circuit 7. In this way the compressed air is preheated in two stages, the first stage being the recuperators 27, 46 and the second stage being the air heaters 28, 47.

The fuel gases from the combustion chambers 25, 42 arrive by way of lines 32, 44 in gas turbines 29, 39, which can be formed as twin shaft gas turbines, and drive the compressors 26, 43 and generators 37, 40. The exhaust gases from the gas turbines 29, 39 flow through the recuperators 27, 46 and at full load partly through by-pass lines 41, 45. They are supplied to the furnace by a line 33. The exhaust still contains a large proportion of oxygen since the gas turbines 29, 39 have to be operated with a considerable excess of air so as not to allow the combustion temperatures to rise above the permissible load. The exhaust gases can therefore be used as oxidant for the residual coke supplied to the furnace by a line 35 and, at full load, for additional coal dust supplied by the line 36. The flue gases escape from the furnace 10 through a stack 38.

The temperatures in the heat transfer system, comprising the sodium heater 9, the process air preheater 6, the process steam generator 22, the fuel gas preheater 21 and the combustion air preheaters 28, 47 can be controlled similarly to the preheating of the compressed air in the recuperators 27, 46, in that part of the flue gases from the furnace 10 are diverted past the sodium heater 9 at full load while the loading of the sodium heater 9 with the flue gases becomes progressively larger at part load so that the temperatures in the sodium circuit 7 rise correspondingly. In this manner the amount of heat available for the gasification reactor 2 also increased, so that in the gasification reactor 2 an increase in the degree of gasification can be obtained with constant quality of fuel gas, and by switching off one of the gas turbines 29, 39 constant power output can be obtained with decreasing amounts of fuel gas.

What is claimed is:

1. A process for controlling the power output of a coal power plant operated using the combined gas turbine-steam turbine process by means of a gas turbine plant and a steam power plant comprising a steam generator with a furnace and a steam turbine, in which coal is partly gasified in a coal gasification installation, the fuel gas produced is supplied to the gas turbine and the residual coke to the furnace of the steam generator, wherein the proportion of the total power output of the power station provided by the gas turbine plant and the degree of gasification in the coal gasification installation are controlled so as to increase from full load to part load, the amount of fuel gas produced being adjusted according to the power requirement of the gas turbine and the proportion of residual coke being reduced according to the power requirements of the steam turbine, while decreasing the amount of coal supplied overall.

2. A process according to claim 1, wherein between the gas turbine, the furnace of the steam generator and the coal gasification installation there is a heat transfer system whose temperatures can be controlled to increase from full load to part load.

3. A process according to claim 2, wherein the proportion of the total power output of the power station provided by the gas turbine plant from full load to part load is additionally controlled by increasing the temperature of at least one of the fuel gas supplied to the gas turbine plant and the compressed air.

4. A process according to claim 2, wherein the degree of gasification in the coal gasification installation is controlled by increasing the temperature of the process air and if necessary by altering the amount of process air supplied to the coal gasification installation.

5. A process according to claim 1, wherein in the upper load region additional fuel is supplied to the furnace of the steam generator besides the residual coke from the coal gasification installation.

6. A process according to claim 2, wherein by increasing the temperature of the process air the quality of the gas is held substantially constant as the degree of gasification is increased.

7. A process according to claim 2, wherein the temperature of the compressed air ahead of the gas turbine combustion chambers is controlled by a recuperator arranged in the gas-turbine exhaust gas line with an adjustable by-pass arranged parallel thereto.

8. A process according to claim 7, wherein the compressed air of the gas turbine plant is preheated in a two-stage preheating process, heat being supplied in the first stage from the gas turbine exhaust gases and heat being supplied in the second stage from the furnace of the steam generator.

9. A process according to claim 2, wherein a heat exchange medium that is liquid at a slight overpressure and high temperatures is used in the heat transfer system.

10. A process according to claim 1, wherein between full load and part load of the power station the gas turbine plant is controlled at substantially constant power output and the steam turbine with decreasing power output.

11. A process according to claim 1, wherein the gas turbine power plant is divided up into a plurality of units which are run at substantially constant power output and between full load and part load the gas turbine power output is controlled by switching off one or more of the units and the steam turbine power is decreased.

* * * * *